United States Patent
DeLuca et al.

(10) Patent No.: US 7,474,341 B2
(45) Date of Patent: *Jan. 6, 2009

(54) PORTABLE DIGITAL CAMERA WITH RED EYE FILTER

(75) Inventors: Michael J. DeLuca, Boca Raton, FL (US); Yury Prilutsky, San Mateo, CA (US); Eran Steinberg, San Francisco, CA (US); Peter Corcoran, Claregalway (IE); Alexei Pososin, Galway (IE); Petronel Bigioi, Galway (IE); Alexandru Drimbarean, Brasov (RO); Adrian Capata, Bucharest (RO); Florin Nanu, Bucharest (RO)

(73) Assignee: FotoNation Vision Limited, Galway (IE)

( * ) Notice: Subject to any disclaimer, the term of this patent is extended or adjusted under 35 U.S.C. 154(b) by 22 days.

This patent is subject to a terminal disclaimer.

(21) Appl. No.: 11/769,206

(22) Filed: Jun. 27, 2007

(65) Prior Publication Data

US 2008/0002060 A1 Jan. 3, 2008

Related U.S. Application Data

(60) Division of application No. 10/772,767, filed on Feb. 4, 2004, now Pat. No. 7,352,394, which is a continuation-in-part of application No. 10/635,862, filed on Aug. 5, 2003, which is a continuation-in-part of application No. 10/170,511, filed on Jun. 12, 2002, now Pat. No. 7,042,505, which is a continuation of application No. 08/947,603, filed on Oct. 9, 1997, now Pat. No. 6,407,777.

(51) Int. Cl.
*H04N 5/76* (2006.01)
*H04N 5/222* (2006.01)
*H04N 5/228* (2006.01)
*H04N 5/217* (2006.01)
*H04N 5/235* (2006.01)

(52) U.S. Cl. .............. 348/231.3; 348/241; 348/222.1; 348/371

(58) Field of Classification Search .............. 348/222.1, 348/241, 246, 247, 370, 371, 576, 231.2, 348/231.3, 231.6, 231.9; 382/275, 167, 117; 396/158

See application file for complete search history.

(56) References Cited

U.S. PATENT DOCUMENTS 5,748,764 A * 5/1998 Benati et al. ................. 382/117
5,847,714 A * 12/1998 Naqvi et al. ................. 345/668

(Continued)

*Primary Examiner*—Ngoc-Yen T Vu
*Assistant Examiner*—Carramah J Quiett
(74) *Attorney, Agent, or Firm*—Andrew V. Smith

(57) ABSTRACT

A digital camera has an integral flash and stores and displays a digital image. Under certain conditions, a flash photograph taken with the camera may result in a red-eye phenomenon due to a reflection within an eye of a subject of the photograph. A digital apparatus has a red-eye filter which analyzes the stored image for the red-eye phenomenon and modifies the stored image to eliminate the red-eye phenomenon by changing the red area to black. The modification of the image is enabled when a photograph is taken under conditions indicative of the red-eye phenomenon. The modification is subject to anti-falsing analysis which further examines the area around the red-eye area for indicia of the eye of the subject. The detection and correction can be optimized for performance and quality by operating on subsample versions of the image when appropriate.

27 Claims, 6 Drawing Sheets

U.S. PATENT DOCUMENTS 5,974,189 A * 10/1999 Nicponski .................. 382/254
6,407,777 B1 * 6/2002 DeLuca ..................... 348/576
7,042,505 B1 * 5/2006 DeLuca ..................... 348/241
2008/0043121 A1 * 2/2008 Prilutsky et al. ............ 348/239

* cited by examiner

PORTABLE DIGITAL CAMERA WITH RED EYE FILTER

PRIORITY

This application is a division of U.S. patent application Ser. No. 10/772,767, filed Feb. 4, 2004, which is a continuation-in-part application (CIP) which claims the benefit of priority to U.S. patent application Ser. No. 10/635,862, filed Aug. 5, 2003, which is a continuation-in-part of U.S. patent application Ser. No. 10/170,511, now U.S. Pat. No. 7,042,505, which is a continuation of U.S. patent application Ser. No. 08/947,603, filed Oct. 9, 1997, now U.S. Pat. No. 6,407,777, which are each hereby incorporated by reference. This application is related to U.S. patent application Ser. No. 10/635,918, filed Aug. 5, 2003 and a continuation-in-part of the '918 application filed contemporaneously with the present application.

FIELD OF THE INVENTION

The invention relates generally to the area of flash photography, and more specifically to filtering "red-eye" from a digital camera image.

BACKGROUND OF THE INVENTION

"Red-eye" is a phenomenon in flash photography where a flash is reflected within a subject's eye and appears in a photograph as a red dot where the black pupil of the subject's eye would normally appear. The unnatural glowing red of an eye is due to internal reflections from the vascular membrane behind the retina, which is rich in blood vessels. This objectionable phenomenon is well understood to be caused in part by a small angle between the flash of the camera and the lens of the camera. This angle has decreased with the miniaturization of cameras with integral flash capabilities. Additional contributors include the relative closeness of the subject to the camera and ambient light levels.

The red-eye phenomenon can be minimized by causing the iris to reduce the opening of the pupil. This is typically done with a "pre-flash", a flash or illumination of light shortly before a flash photograph is taken. This causes the iris to close. Unfortunately, the pre-flash is an objectionable 0.2 to 0.6 seconds prior to the flash photograph. This delay is readily discernible and easily within the reaction time of a human subject. Consequently the subject may believe the pre-flash is the actual photograph and be in a less than desirable position at the time of the actual photograph. Alternately, the subject must be informed of the pre-flash, typically loosing any spontaneity of the subject captured in the photograph.

Those familiar with the art have developed complex analysis processes operating within a camera prior to invoking a pre-flash. Various conditions are monitored prior to the photograph before the pre-flash is generated, the conditions include the ambient light level and the distance of the subject from the camera. Such a system is described in U.S. Pat. No. 5,070,355 to Inoue et al. Although that invention minimizes the occurrences where a pre-flash is used, it does not eliminate the need for a pre-flash. What is needed is a method of eliminating the red-eye phenomenon with a miniature camera having an integral without the distraction of a pre-flash.

Digital cameras are becoming more popular and smaller in size. Digital cameras have several advantages over film cameras. Digital cameras eliminate the need for film as the image is digitally captured and stored in a memory array for display on a display screen on the camera itself. This allows photographs to be viewed and enjoyed virtually instantaneously as opposed to waiting for film processing. Furthermore, the digitally captured image may be downloaded to another display device such as a personal computer or color printer for further enhanced viewing. Digital cameras include microprocessors for image processing and compression and camera systems control. Nevertheless, without a pre-flash, both digital and film cameras can capture the red-eye phenomenon as the flash reflects within a subject's eye. Thus, what is needed is a method of eliminating red-eye phenomenon within a miniature digital camera having a flash without the distraction of a pre-flash.

BRIEF SUMMARY OF THE INVENTION

A portable digital camera having no photographic film includes an integral flash for providing illumination during image acquisition and/or recording, a digital image capturing apparatus for acquiring and/or recording an image, and a red-eye filter. The red eye filter is for modifying an area within the image indicative of a red-eye phenomenon based on an analysis of a subsample representation of selected regions of the image.

The analysis may be performed at least in part for determining the area, and/or may be performed at least in part for determining the modifying. The selected regions of the digitized image may include the entire image or one or more regions may be excluded. The selected regions may include multi resolution encoding of the image. The analysis may be performed in part on a full resolution image and in part on a subsample resolution of the digital image.

The apparatus may include a module for changing the degree of said subsampling. This changing the degree of the subsampling may be determined empirically, and/or based on a size of the image or selected regions thereof, and/or based on data obtained from the camera relating to the settings of the camera at the time of image capture. In the latter case, the data obtained from the camera may include an aperture setting, focus of the camera, distance of the subject from the camera, or a combination of these. The changing the degree of the subsampling may also be determined based digitized image metadata information and/or a complexity of calculation for the red eye filter.

The modifying of the area may be performed including the full resolution of the digital image. The red-eye filter may include multiple sub filters. The subsampling for the sub filters operating on selected regions of the image may be determined by one or more of the image size, suspected as red eye region size, filter computation complexity, empirical success rate of said sub filter, empirical false detection rate of said sub filter, falsing probability of said sub filter, relations between said suspected regions as red eye, results of previous analysis of other said sub filters.

The apparatus may include a memory for saving the digitized image after applying the filter for modifying pixels as a modified image, and/or a memory for saving the subsample representation of the image. The subsample representation of selected regions of the image may be determined in hardware. The analysis may be performed in part on the full resolution image and in part on a subsample resolution of the image.

The subsample representation may be determined using spline interpolation, and may be determined using bi-cubic interpolation.

According to another aspect, a portable digital camera having no photographic film includes an integral flash for providing illumination during image acquisition and/or recording, a digital image capturing apparatus for acquiring and/or recording an image, an image store and a red-eye filter.

The image store is for holding a temporary copy of an unprocessed image known as a pre-capture image, a permanent copy of a digitally processed, captured image, and a subsample representation of selected regions of at least one of the images, e.g., the pre-capture image. The red-eye filter is for modifying an area within at least one of the images indicative of a red-eye phenomenon based on an analysis of the subsample representation. Preferably, the at least one of the images includes the digitally processed, captured image. This further aspect may also include one or more features in accordance with the first aspect.

In addition, the changing the degree of the subsampling may be determined based on data obtained from the camera relating to image processing analysis of said precapture images. The image processing analysis may be based on histogram data or color correlogram data, or both, obtained from the pre-capture image. The image processing analysis may also be based on global luminance or white balance image data, or both, obtained from the pre-capture image. The image processing analysis may also be based on a face detection analysis of the pre-capture image, or on determining pixel regions with a color characteristic indicative of redeye, or both. The image processing analysis may be performed in hardware. The changing of the degree of the subsampling may be determined based on image metadata information.

The red eye filter of a camera in accordance with either aspect may include a pixel locator, a shape analyzer and/or a pixel modifier. The pixel locator is for locating pixels having a color indicative of the red-eye phenomenon. The shape analyzer is for determining if a grouping of at least a portion of the pixels located by the pixel locator comprise a shape indicative of the red-eye phenomenon. The pixel modifier is for modifying the color of the pixels within the grouping. The camera may further include a falsing analyzer for further processing the image in a vicinity of the grouping for details indicative of an eye, and for enabling the pixel modifier in response thereto. The camera may also include an exposure analyzer for determining if the image was acquired and/or recorded in a condition indicative of the red-eye phenomenon.

A method of filtering a red eye phenomenon from an acquired and/or recorded image is also provided in accordance with another aspect, wherein the image includes a multiplicity of pixels indicative of color. The method includes determining whether one or more regions within a subsample representation of the acquired and/or recorded image are suspected as including red eye artifact.

The method may include varying a degree of the subsample representation for each region of the one or more regions based on the image, and/or generating a subsample representation based on the image. The subsample representation may be generated or the degree varied, or both, utilizing a hardware-implemented subsampling engine. One or more regions within said subsample representation determined as including red eye artifact may be tested for determining any false redeye groupings.

The method may further include associating the one or more regions within the subsample presentation of the image with one or more corresponding regions within the acquired and/or recorded image, and modifying the one or more corresponding regions within the acquired and/or recorded image. The determining may include analyzing meta-data information including image acquisition device-specific information.

The method may include analyzing the subsample representation of selected regions of the acquired and/or recorded image, and modifying an area determined to include red eye artifact. The analysis may be performed at least in part for determining said area and/or thee modifying. The selected regions of the image may include the entire image or may exclude one or more regions. The selected regions of the image may include multi resolution encoding of the image. The analyzing may be performed in part on a full resolution image and in part on a subsample resolution of the image.

The method may include changing the degree of the subsampling. This changing of the degree of subsampling may be determined empirically, and/or based on a size of the image or selected regions thereof.

The method may include saving the image after applying the filter for modifying pixels as a modified image, and/or saving the subsample representation of the image. The method may include determining the subsample representation of the image in hardware, and/or using a spline or bi-cubic interpolation.

The modifying of the area may be performed including the full resolution of the image. The method may include determining the subsample representation utilizing a plurality of sub-filters. The determining of the plurality of sub-filters may be based on one or more of the image size, a suspected red eye region size, filter computation complexity, empirical success rate of the sub-filter, empirical false detection rate of the sub-filter, falsing probability of the sub-filter, relations between said suspected red eye regions, or results of previous analysis of one or more other sub-filters.

The method may further include locating pixels, analyzer pixel shapes and/or modifiying pixels, each in accordance with identifying and removing a red eye phenomenon form an acquired and/or recorded digital image. That is, the method may include locating pixels having a color indicative of the red-eye phenomenon. The method may further include determining if a grouping of at least a portion of the located pixels comprise a shape indicative of the red-eye phenomenon. The method may further include modifying the color of the pixels within the grouping. The method may further include processing the image in a vicinity of the grouping for details indicative of an eye, and enabling the pixel modifier in response thereto. The method may further include determining if the image was acquired and/or recorded in a condition indicative of the red-eye phenomenon.

DESCRIPTION OF A PREFERRED EMBODIMENT

Figure 1:
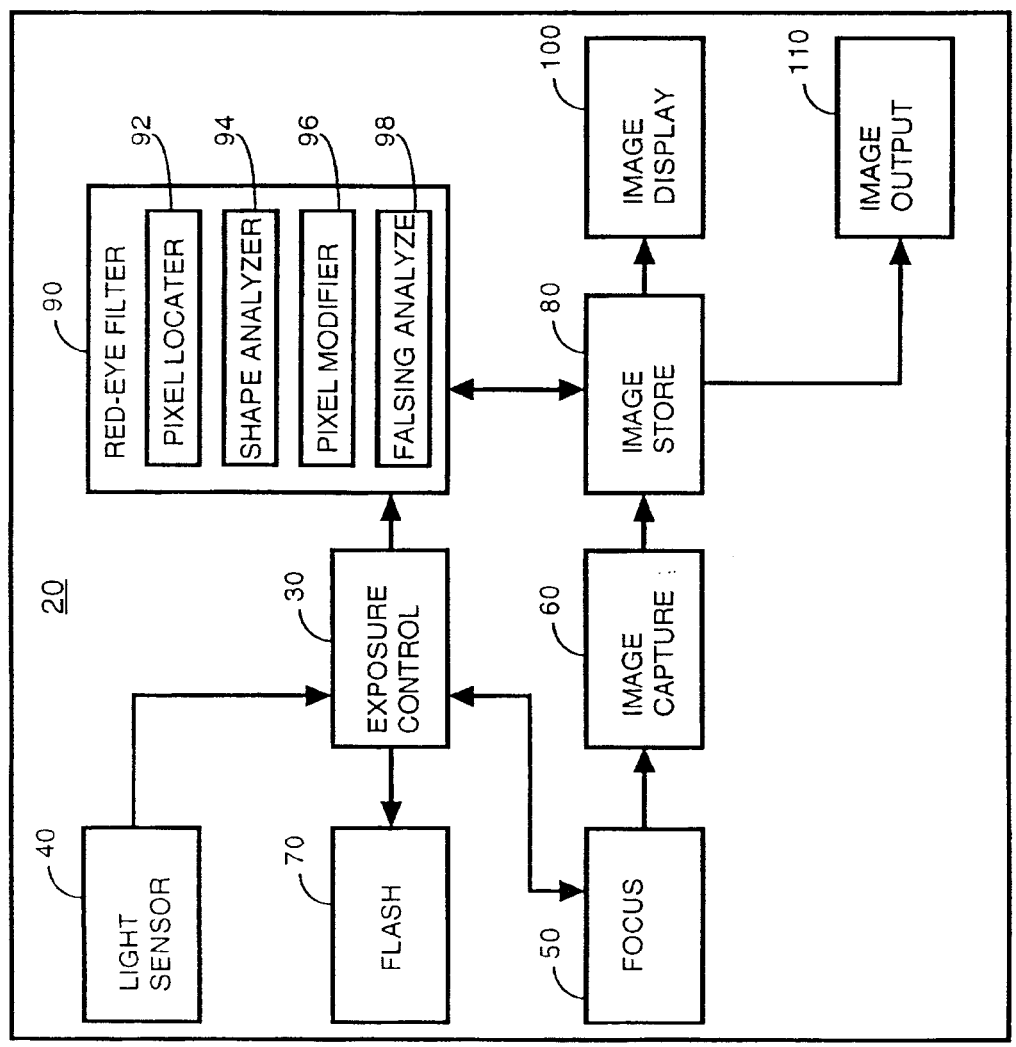
FIG. 1 shows a block diagram of a camera apparatus operating in accordance with the present invention.

FIG. 1 shows a block diagram of a camera apparatus operating in accordance with the present invention. The camera 20 includes an exposure control 30 that, in response to a user input, initiates and controls the digital photographic process. Ambient light is determined using light sensor 40 in order to automatically determine if a flash is to be used. The distance to the subject is determined using focusing means 50 which also focuses the image on image capture means 60. The image capture means digitally records the image in color. The image capture means is known to those familiar with the art and may include a CCD (charge coupled device) to facilitate digital recording. If a flash is to be used, exposure control means 30 causes the flash means 70 to generate a photographic flash in substantial coincidence with the recording of the image by image capture means 60. The flash may be selectively generated either in response to the light sensor 40 or a manual input from the user of the camera. The image recorded by image capture means 60 is stored in image store means 80 which may comprise computer memory such a dynamic random access memory or a nonvolatile memory. The red-eye filter 90 then analyzes the stored image for characteristics of red-eye, and if found, modifies the image and removes the red-eye phenomenon from the photograph as will be describe in more detail. The red-eye filter includes a pixel locator 92 for locating pixels having a color indicative of red-eye; a shape analyzer 94 for determining if a grouping of at least a portion of the pixels located by the pixel locator comprise a shape indicative of red-eye; a pixel modifier 96 for modifying the color of pixels within the grouping; and an falsing analyzer 98 for further processing the image around the grouping for details indicative of an image of an eye. The modified image may be either displayed on image display 100 or downloaded to another display device, such as a personal computer or printer via image output means 110. It can be appreciated that many of the processes implemented in the digital camera may be implemented in or controlled by software operating in a microcomputer (μC) or digital signal processor (DSP) and/or an application specific integrated circuit (ASIC).

In a further embodiment the image capture means 60 of FIG. 1 includes an optional image subsampling means, wherein the image is actively down-sampled. In one embodiment, the subsampling is done using a bi-cubic spline algorithm, such as those that are known to one familiar in the art of signal and image processing. Those familiar with this art are aware of subsampling algorithms that interpolate and preserve pixel relationships as best they can given the limitation that less data is available. In other words, the subsampling stage is performed to maintain significant data while minimizing the image size, thus the amount of pixel-wise calculations involved, which are generally costly operations.

A subsample representation may include a multi resolution presentation of the image, as well as a representation in which the sampling rate is not constant for the entire image. For example, areas suspected as indicative of red eye may have different resolution, most likely higher resolution, than areas positively determined not to include red eye.

In an alternative embodiment, the subsampling means utilizes hardware based subsampling wherein the processing unit of the digital imaging appliance incorporates a dedicated subsampling engine providing the advantage of a very fast execution of a subsampling operation. Such digital imaging appliance with dedicated subsampling engine may be based on a state-of-art digital imaging appliance incorporating hardware that facilitates the rapid generation of image thumbnails.

The decision to subsample the image is, in part, dependent on the size of the original image. If the user has selected a low resolution image format, there may be little gain in performance of redeye detection and false avoidance steps. Thus, the inclusion of a subsampling means, or step or operation, is optional.

The red eye detection filter of the preferred embodiment may comprise a selection of sub filters that may be calculated in succession or in parallel. In such cases, the sub-filters may operate on only a selected region, or a suspected region. Such regions are substantially smaller than the entire image. The decision to subsample the image is, in part, dependent on one or a combination of a few factors such as the size of the suspected region, the success or failure of previous or parallel filters, the distance between the regions and the complexity of the computation of the sub filter. Many of the parameters involved in deciding whether or not to subsample a region, and to what degree, may also be determined by an empirical process of optimization between success rate, failure rate and computation time.

Where the subsampling means, step or operation is implemented, then both the original and subsampled images are preferably stored in the image store 80 of FIG. 1. The subsampled image is now available to be used by the redeye detector 90 and the false avoidance analyzer 98 of FIG. 1.

As discussed before, the system and method of the preferred embodiment involves the detection and removal of red eye artifacts. The actual removal of the red eye will eventually be performed on the full resolution image. However, all or portions of the detection of redeye candidate pixel groupings, the subsequent testing of said pixel groupings for determining false redeye groupings, and the initial step of the removal, where the image is presented to the user for user confirmation of the correction, can be performed on the entire image, the subsampled image, or a subset of regions of the entire image or the subsampled image.

There is generally a tradeoff between speed and accuracy. Therefore, according to yet another embodiment involving performing all detection on the subsampled image, the detection, and subsequent false-determining, may be performed selectively, e.g., sometimes on full resolution regions that are suspected as red-eye, and sometimes on a subsampled resolution. We remark that the search step 200 of FIG. 8 comprises, in a practical embodiment, a number of successively applied color filters based on iterative refinements of an initial pixel by pixel search of the captured image. In addition to searching for a red color, it is preferably determined whether the luminance, or brightness of a redeye region, lies within a suitable range of values. Further, the local spatial distribution of color and luminance are relevant factors in the initial search for redeye pixel groupings. As each subsequent filter is preferably only applied locally to pixels in close proximity to a grouping of potential redeye pixels, it can equally well be applied to the corresponding region in the full-sized image.

Thus, where it is advantageous to the accuracy of a particular color-based filter, it is possible to apply that filter to the full-sized image rather than to the subsampled image. This applies equally to filters which may be employed in the false-determining analyzer 98.

Examples of non-color based false-determining analysis filters include those which consider the localized contrast, saturation or texture distributions in the vicinity of a potential redeye pixel grouping, those that perform localized edge or shape detection and more sophisticated filters which statistically combine the results of a number of simple local filters to enhance the accuracy of the resulting false-determining analysis.

It is preferred that more computationally expensive filters that operate on larger portions of the images will utilize a subsampled version, while the more sensitive and delicate filters may be applied to the corresponding region of the full resolution image. It is preferred that in the case of full resolution only small portions of the image will be used for such filters.

As a non exhaustive example, filters that look for a distinction between lips and eyes may utilize a full resolution portion, while filters that distinguish between background colors may use a subsample of the image. Furthermore, several different sizes of subsampled images may be generated and employed selectively to suit the sensitivity of the different pixel locating and false determining filters.

The decision whether the filter should use a subsampled representation, and the rate of the downsampling, may be determined empirically by a-priori statistically comparing the success rate vs. mis-detection rate of a filter with the subsampling rate and technique of known images. It is further worth noting that the empirical determination will often be specific to a particular camera model. Thus, the decision to use the full sized image or the subsampled image data, for a particular pixel locating or false determining filter, may be empirically determined for each camera.

In another aspect, a pre-acquisition or precapture image may be effectively utilized in an embodiment of the invention. Another type of subsampled representation of the image may be one that differs temporally from the captured image, in addition or alternative to the spatial differentiation with other aforementioned algorithms such as spline and bi-cubic. The subsample representation of the image may be an image captured before the final image is captured, and preferably just before. A camera may provide a digital preview of the image, which may be a continuous subsample version of the image. Such pre-capture may be used by the camera and the camera user, for example, to establish correct exposure, focus and/or composition.

The precapture image process may involve an additional step of conversion from the sensor domain, also referred to as raw-ccd, to a known color space that the red eye filter is using for calculations. In the case that the preview or precapture image is being used, an additional step of alignment may be used in the case that the final image and the pre-capture differ, such as in camera or object movement.

The pre-acquisition image may be normally processed directly from an image sensor without loading it into camera memory. To facilitate this processing, a dedicated hardware subsystem is implemented to perform pre-acquisition image processing. Depending on the settings of this hardware subsystem, the pre-acquisition image processing may satisfy some predetermined criteria which then implements the loading of raw image data from the buffer of the imaging sensor into the main system memory together with report data, possibly stored as metadata, on the predetermined criteria. One example of such a test criterion is the existence of red areas within the pre-acquisition image prior to the activation of the camera flash module. Report data on such red areas can be passed to the redeye filter to eliminate such areas from the redeye detection process. Note that where the test criteria applied by the pre-acquisition image processing module are not met then it can loop to obtain a new pre-acquisition test image from the imaging sensor. This looping may continue until either the test criteria are satisfied or a system time-out occurs. Note further that the pre-acquisition image processing step is significantly faster than the subsequent image processing chain of operations due to the taking of image data directly from the sensor buffers and the dedicated hardware subsystem used to process this data.

Once the test criteria are satisfied, the raw image data may be then properly loaded into main system memory to allow image processing operations to convert the raw sensor data into a final pixelated image. Typical steps may include converting Bayer or RGGB image data to YCC or RGB pixelated image data, calculation and adjustment of image white balance, calculation and adjustment of image color range, and calculation and adjustment of image luminence, potentially among others.

Following the application of this image processing chain, the final, full-size image may be available in system memory, and may then be copied to the image store for further processing by the redeye filter subsystem. A camera may incorporate dedicated hardware to do global luminance and/or color/grayscale histogram calculations on the raw and/or final image data. One or more windows within the image may be selected for doing "local" calculations, for example. Thus, valuable data may be obtained using a first pass" or pre-acquisition image before committing to a main image processing approach which generates a more final picture.

A subsampled image, in addition to the precapture and more finalized images, may be generated in parallel with the final image by a main image processing toolchain. Such processing may be preferably performed within the image capture module 60 of FIG. 1. An exemplary process may include the following operations. First, a raw image may be acquired or pre-captured. This raw image may be processed prior to storage. This processing may generate some report data based on some predetermined test criteria. If the criteria are not met, the pre-acquisition image processing operation may obtain a second, and perhaps one or more additional, pre-acquisition images from the imaging sensor buffer until such test criteria are satisfied.

Once the test criteria are satisfied, a full-sized raw image may be loaded into system memory and the full image processing chain may be applied to the image. A final image and a subsample image may then ultimately preferably be generated.

Figure 11:
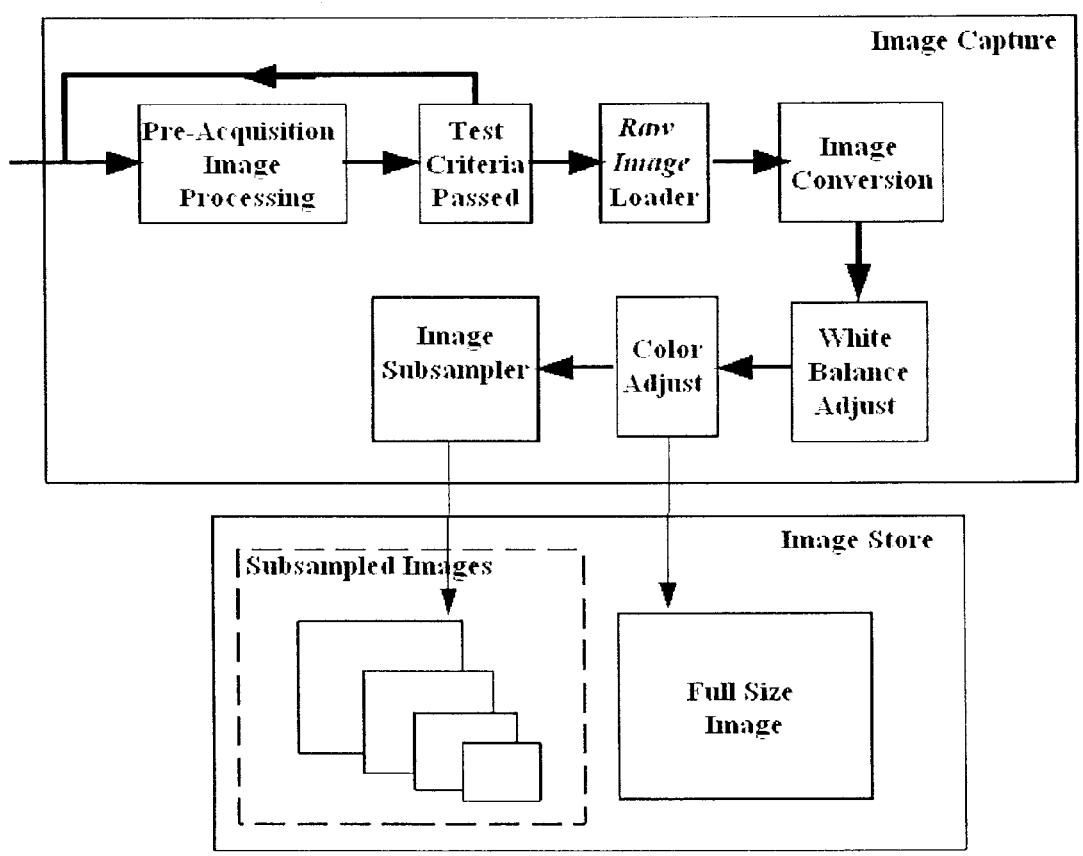
FIG. 11 illustrates in block form an exemplary arrangement in accordance with a precapture image utilization aspect.

FIG. 11 illustrates in block form a further exemplary arrangement in accordance with a precapture image utilization aspect. After the pre-acquisition test phase, the "raw" image is loaded from the sensor into the image capture module. After converting the image from its raw format (e.g., Bayer RGGB) into a more standardized pixel format such as YCC or RGB, it may be then subject to a post-capture image processing chain which eventually generates a full-sized final image and one or more subsampled copies of the original. These may be preferably passed to the image store, and the red-eye filter is preferably then applied. Note that the image capture and image store functional blocks of FIG. 11 correspond to blocks 60 and 80 illustrated at FIG. 1.

Figure 2:
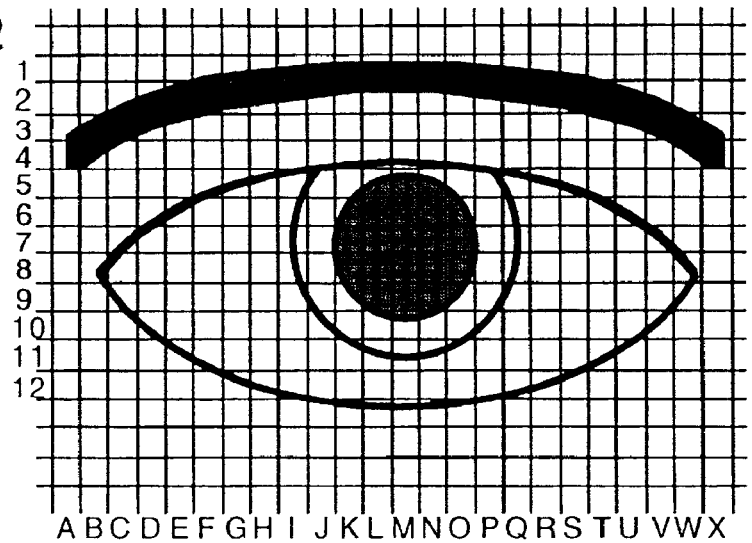
FIG. 2 shows a pixel grid upon which an image of an eye is focused.

FIG. 2 shows a pixel grid upon which an image of an eye is focused. Preferably the digital camera records an image comprising a grid of pixels at least 640 by 480. FIG. 2 shows a 24 by 12 pixel portion of the larger grid labeled columns A-X and rows 1-12 respectively.

Figure 3:
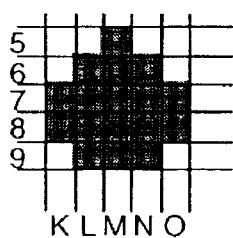
FIG. 3 shows pixel coordinates of the pupil of FIG. 2.

FIG. 3 shows pixel coordinates of the pupil of FIG. 2. The pupil is the darkened circular portion and substantially includes seventeen pixels: K7, K8, L6, L7, L8, L9, M5, M6, M7, M8, M9, N6, N7, N8, N9, O7 and O8, as indicated by shaded squares at the aforementioned coordinates. In a non-flash photograph, these pupil pixels would be substantially black in color. In a red-eye photograph, these pixels would be substantially red in color. It should be noted that the aforementioned pupil pixels have a shape indicative of the pupil of the subject, the shape preferably being a substantially circular, semi-circular or oval grouping of pixels. Locating a group of substantially red pixels forming a substantially circular or oval area is useful by the red-eye filter.

Figure 4:
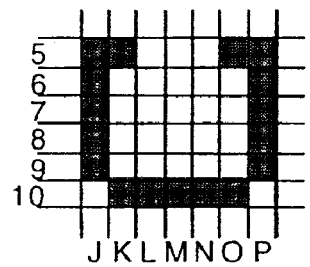
FIG. 4 shows pixel coordinates of the iris of FIG. 2.

FIG. 4 shows pixel coordinates of the iris of FIG. 2. The iris pixels are substantially adjacent to the pupil pixels of FIG. 2. Iris pixels J5, J6, J7, J8, J9, K5, K10, L10, M10, N10, O5, O10, P5, P6, P7, P8 and P9 are indicated by shaded squares at the aforementioned coordinates. The iris pixels substantially surround the pupil pixels and may be used as further indicia of a pupil. In a typical subject, the iris pixels will have a substantially constant color. However, the color will vary as the natural color of the eyes each individual subject varies. The existence of iris pixels depends upon the size of the iris at the time of the photograph, if the pupil is very large then iris pixels may not be present.

Figure 5:
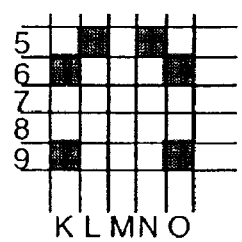
FIG. 5 shows pixel coordinates which contain a combination of iris and pupil colors of FIG. 2.

FIG. 5 shows pixel coordinates which include a combination of iris and pupil colors of FIG. 2. The pupil/iris pixels are located at K6, K9, L5, N5, O6, and O9, as indicated by shaded squares at the aforementioned coordinates. The pupil/iris pixels are adjacent to the pupil pixels, and also adjacent to any iris pixels which may be present. Pupil/iris pixels may also contain colors of other areas of the subject's eyes including skin tones and white areas of the eye.

Figure 6:
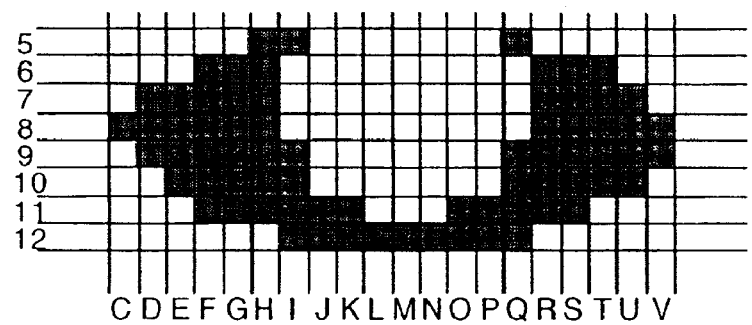
FIG. 6 shows pixel coordinates of the white eye area of FIG. 2.

FIG. 6 shows pixel coordinates of the white eye area of FIG. 2. The seventy one pixels are indicated by the shaded squares of FIG. 6 and are substantially white in color and are in the vicinity of and substantially surround the pupil pixels of FIG. 2.

Figure 7:
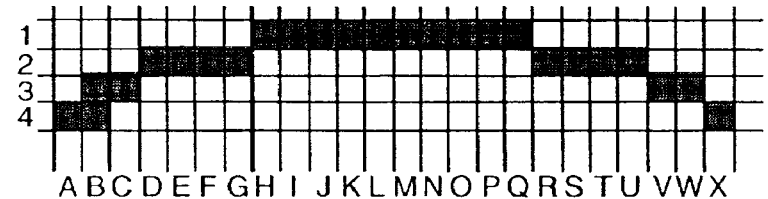
FIG. 7 shows pixel coordinates of the eyebrow area of FIG. 2.

FIG. 7 shows pixel coordinates of the eyebrow area of FIG. 2. The pixels are indicated by the shaded squares of FIG. 7 and are substantially white in color. The eyebrow pixels substantially form a continuous line in the vicinity of the pupil pixels. The color of the line will vary as the natural color of the eyebrow of each individual subject varies. Furthermore, some subjects may have no visible eyebrow at all.

It should be appreciated that the representations of FIG. 2 through FIG. 7 are particular to the example shown. The coordinates of pixels and actual number of pixels comprising the image of an eye will vary depending upon a number of variables. These variables include the location of the subject within the photograph, the distance between the subject and the camera, and the pixel density of the camera.

The red-eye filter 90 of FIG. 1 searches the digitally stored image for pixels having a substantially red color, then determines if the grouping has a round or oval characteristics, similar to the pixels of FIG. 3. If found, the color of the grouping is modified. In the preferred embodiment, the color is modified to black.

Searching for a circular or oval grouping helps eliminate falsely modifying red pixels which are not due to the red-eye phenomenon. In the example of FIG. 2, the red-eye phenomenon is found in a 5.times.5 grouping of pixels of FIG. 3. In other examples, the grouping may contain substantially more or less pixels depending upon the actual number of pixels comprising the image of an eye, but the color and shape of the grouping will be similar. Thus for example, a long line of red pixels will not be falsely modified because the shape is not substantially round or oval.

Additional tests may be used to avoid falsely modifying a round group of pixels having a color indicative of the red-eye phenomenon by further analysis of the pixels in the vicinity of the grouping. For example, in a red-eye phenomenon photograph, there will typically be no other pixels within the vicinity of a radius originating at the grouping having a similar red color because the pupil is surrounded by components of the subject's face, and the red-eye color is not normally found as a natural color on the face of the subject. Preferably the radius is large enough to analyze enough pixels to avoid falsing, yet small enough to exclude the other eye of the subject, which may also have the red-eye phenomenon. Preferably, the radius includes a range between two and five times the radius of the grouping. Other indicia of the recording may be used to validate the existence of red-eye including identification of iris pixels of FIG. 4 which surround the pupil pixels. The iris pixels will have a substantially common color, but the size and color of the iris will vary from subject to subject. Furthermore, the white area of the eye may be identified as a grouping of substantially white pixels in the vicinity of and substantially surrounding the pupil pixels as shown in FIG. 6. However, the location of the pupil within the opening of the eyelids is variable depending upon the orientation of the head of the subject at the time of the photograph. Consequently, identification of a number of substantially white pixels in the vicinity of the iris without a requirement of surrounding the grouping will further validate the identification of the red-eye phenomenon and prevent false modification of other red pixel groupings. The number of substantially white pixels is preferably between two and twenty times the number of pixels in the pupil grouping. As a further validation, the eyebrow pixels of FIG. 7 can be identified.

Further, additional criterion can be used to avoid falsely modifying a grouping of red pixels. The criterion include determining if the photographic conditions were indicative of the red-eye phenomenon. These include conditions known in the art including use of a flash, ambient light levels and distance of the subject. If the conditions indicate the red-eye phenomenon is not present, then red-eye filter 90 is not engaged.

FIG. 5 shows combination pupil/iris pixels which have color components of the red-eye phenomenon combined with color components of the iris or even the white area of the eye. The invention modifies these pixels by separating the color components associated with red-eye, modifying color of the separated color components and then adding back modified color to the pixel. Preferably the modified color is black. The result of modifying the red component with a black component makes for a more natural looking result. For example, if the iris is substantially green, a pupil/iris pixel will have components of red and green. The red-eye filter removes the red component and substitutes a black component, effectively resulting in a dark green pixel.

Figure 8:
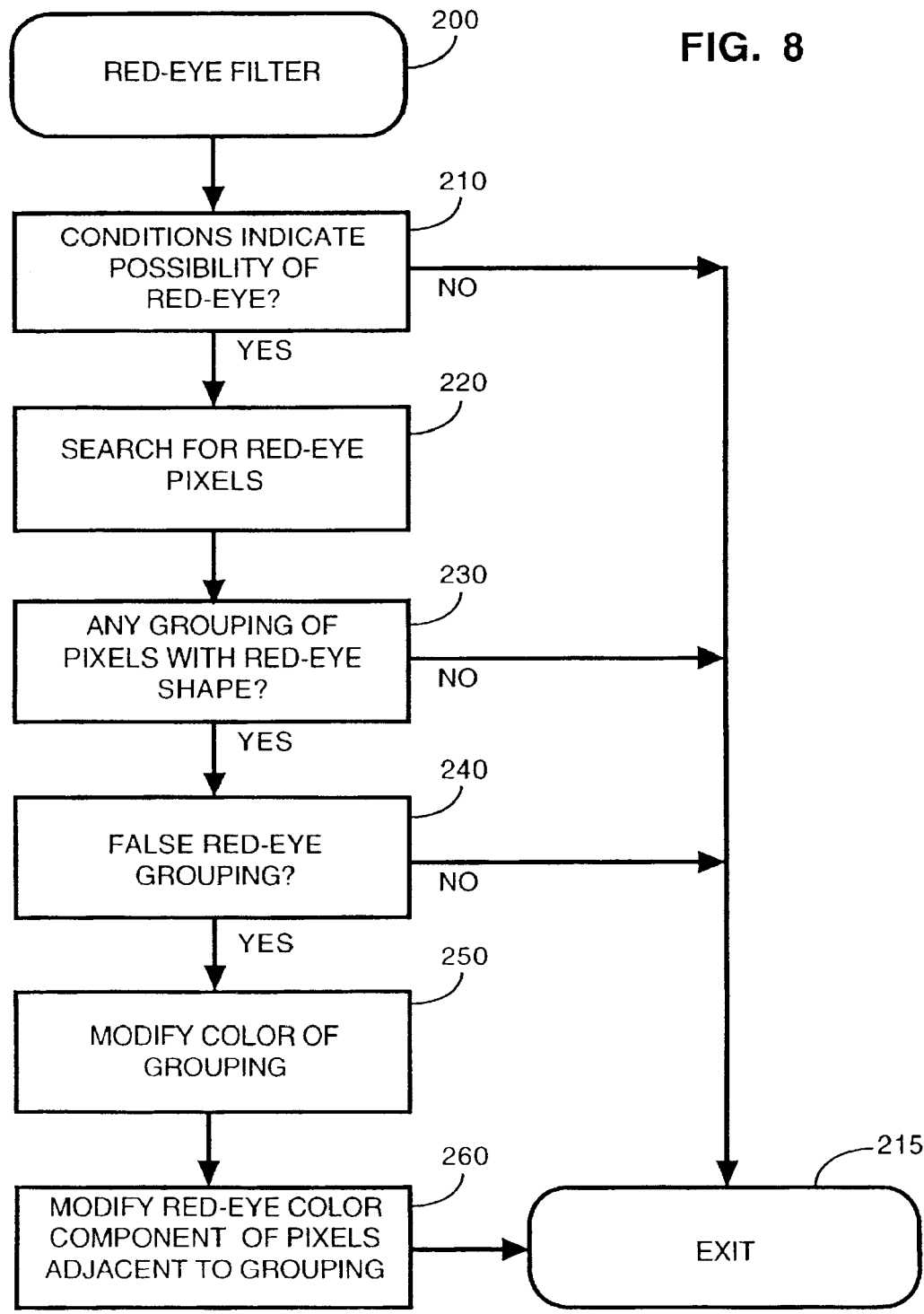
FIG. 8 shows a flow chart of a method operating in accordance with the present invention.

FIG. 8 shows a flow chart of a method operating in accordance with the present invention. The red-eye filter process is in addition to other processes known to those skilled in the art which operate within the camera. These other processes include flash control, focus, and image recording, storage and display. The red-eye filter process preferably operates within software within a .mu.C or DSP and processes an image stored in image store 80. The red-eye filter process is entered at step 200. At step 210 conditions are checked for the possibility of the red-eye phenomenon. These conditions are included in signals from exposure control means 30 which are communicated directly to the red-eye filter. Alternatively the exposure control means may store the signals along with the digital image in image store 80. If conditions do not indicate the possibility of red-eye at step 210, then the process exits at step 215. Step 210 is further detailed in FIG. 9, and is an optional step which may be bypassed in an alternate embodiment. Then is step 220 the digital image is searched of pixels having a color indicative of red-eye. The grouping of the red-eye pixels are then analyzed at step 230. Red-eye is determined if the shape of a grouping is indicative of the red-eye phenomenon. This step also accounts for multiple red-eye groupings in response to a subject having two red-eyes, or multiple subjects having red-eyes. If no groupings indicative of red-eye are found, then the process exits at step 215. Otherwise, false red-eye groupings are checked at optional step 240. Step 240 is further detailed in FIG. 10 and prevents the red-eye filter from falsely modifying red pixel groupings which do not have further indicia of the eye of a subject. After eliminating false groupings, if no grouping remain, the process exits at step 215. Otherwise step 250 modifies the color of the groupings which pass step 240, preferably substituting the color red for the color black within the grouping. Then in optional step 260, the pixels surrounding a red-eye grouping are analyzed for a red component. These are equivalent to the pixels of FIG. 5. The red component is substituted for black by the red-eye filter. The process then exits at step 215.

It should be appreciated that the pixel color modification can be stored directly in the image store by replacing red-eye pixels with pixels modified by the red-eye filter. Alternately the modified pixels can be stored as an overlay in the image store, thereby preserving the recorded image and only modifying the image when displayed in image display 100. Preferably the filtered image is communicated through image output means 110. Alternately the unfiltered image with the overlay may be communicated through image output means 110 to a external device such as a personal computer capable of processing such information.

Figure 9:
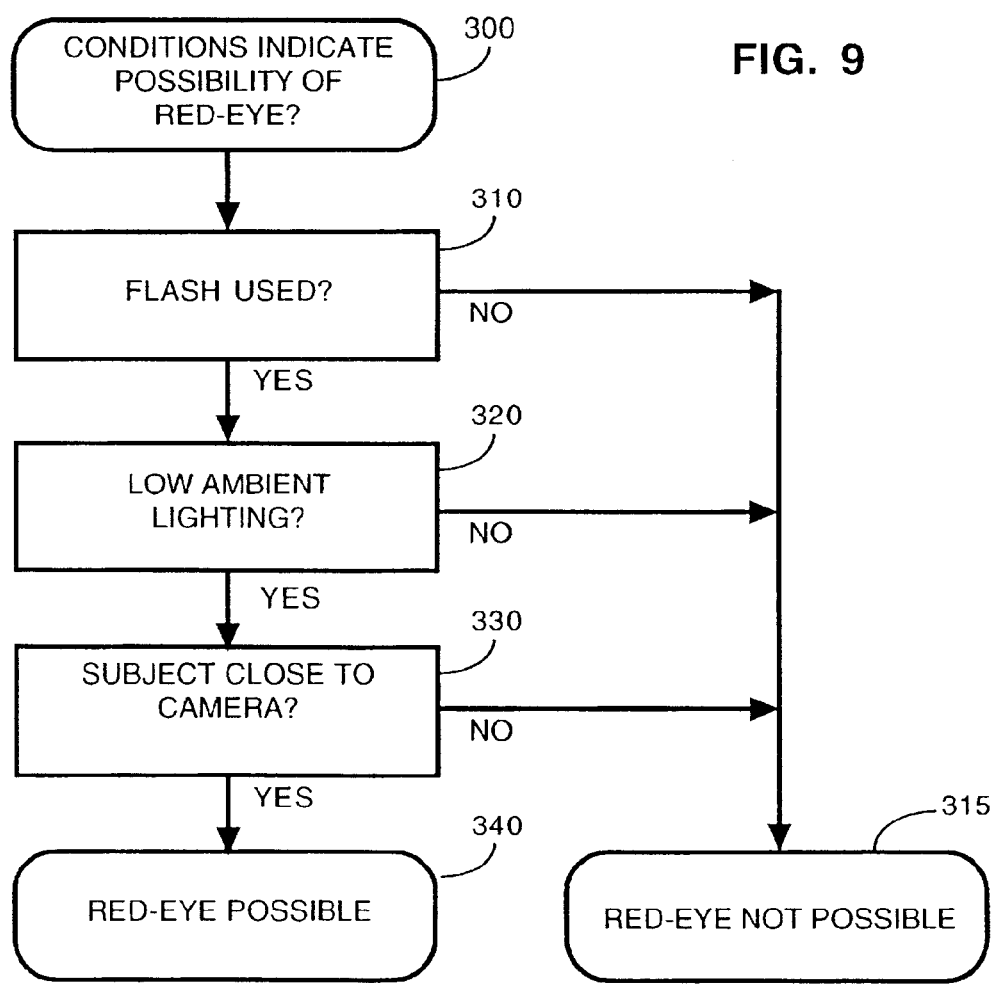
FIG. 9 shows a flow chart for testing if conditions indicate the possibility of a red-eye phenomenon photograph.

FIG. 9 shows a flow chart for testing if conditions indicate the possibility of a red-eye phenomenon corresponding to step 210 of FIG. 8. Entered at step 300, step 310 checks if a flash was used in the photograph. If not, step 315 indicates that red-eye is not possible. Otherwise optional step 320 checks if a low level of ambient light was present at the time of the photograph. If not, step 315 indicates that red-eye is not possible. Otherwise optional step 330 checks if the subject is relatively close to the camera at the time of the photograph. If not, step 215 indicates that red-eye is not possible. Otherwise step 340 indicates that red-eye is possible.

Figure 10:
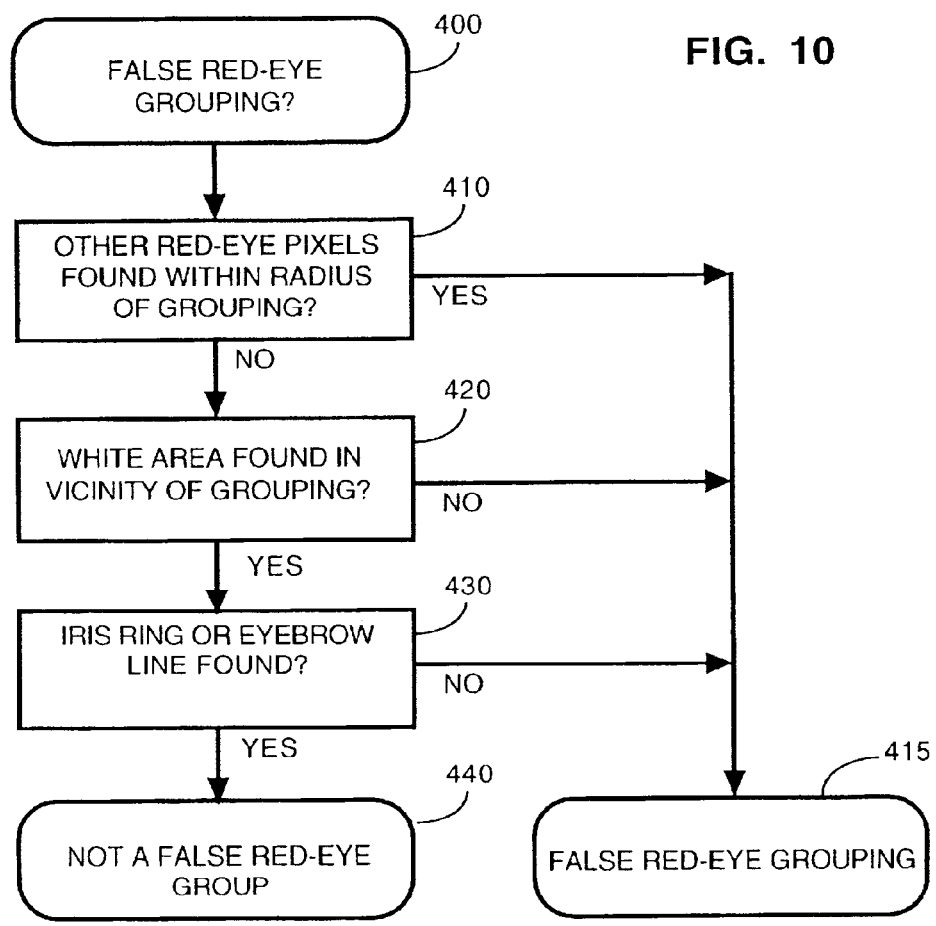
FIG. 10 shows a flow chart for testing if conditions indicate a false red-eye grouping.

FIG. 10 shows a flow chart for testing if conditions indicate a false red-eye grouping corresponding to step 240 of FIG. 8. Entered at step 400, step 410 checks if other red-eye pixels are found within a radius of a grouping. Preferably the radius is between two and five times the radius of the grouping. If found step 415 indicates a false red-eye grouping. Otherwise step 420 checks if a substantially white area of pixels is found in the vicinity of the grouping. This area is indicative of the white area of a subject's eye and has preferably between two and twenty times the number of pixels in the grouping. If not found step 415 indicates a false red-eye grouping. Otherwise step 430 searches the vicinity of the grouping for an iris ring or an eyebrow line. If not found, step 415 indicates a false red-eye grouping. Otherwise step 440 indicates the red-eye grouping is not false. It should be appreciated that each of the tests 410, 420 and 430 check for a false red-eye grouping. In alternate embodiments, other tests may be used to prevent false modification of the image, or the tests of FIG. 10 may be used either alone or in combination.

It should be further appreciated that either the red-eye condition test 210 or the red-eye falsing test 240 of FIG. 8 may be used to achieve satisfactory results. In an alternate embodiment test 240 may be acceptable enough to eliminate test 210, or visa versa. Alternately the selectivity of either the color and/or grouping analysis of the red-eye phenomenon may be sufficient to eliminate both tests 210 and 240 of FIG. 8. Furthermore, the color red as used herein means the range of colors and hues and brightnesses indicative of the red-eye phenomenon, and the color white as used herein means the range of colors and hues and brightnesses indicative of the white area of the human eye.

Thus, what has been provided is an improved method and apparatus for eliminating red-eye phenomenon within a miniature digital camera having a flash without the distraction of a pre-flash.

What is claimed is:

1. A portable digital camera having no photographic film, comprising:
    (a) an integral flash for providing illumination during image acquisition;
    (b) a digital image capturing apparatus for acquiring an image; and
    (c) an image store for holding:
        (i) a temporary copy of an unprocessed image known as a pre-capture image;
        (ii) a permanent copy of a digitally processed, captured image, and
        (iii) a subsample representation of selected regions of the pre-capture image; and
    (d) a red-eye filter for modifying an area within said at least one of the images indicative of a red-eye phenomenon based on an analysis of the subsample representation.

2. The camera of claim 1, wherein said at least one of the images comprises the digitally processed, captured image.

3. The camera of claim 2, wherein said subsample representation of selected regions of said image is determined in hardware.

4. The camera of claim 2, wherein said analysis is performed in part on the full resolution image and in part on a subsample resolution of said image.

5. The camera of claim 2, further comprising a module for changing the degree of said subsampling.

6. The camera of claim 5, wherein said changing the degree of said subsampling is determined empirically.

7. The camera of claim 5, wherein said changing the degree of said subsampling is determined based on a size of said image.

8. The camera of claim 5, wherein said changing the degree of said subsampling is determined based on a region size.

9. The camera of claim 5, wherein said changing the degree of said subsampling is determined based on a complexity of calculation for said red eye filter.

10. The camera of claim 5, wherein said subsample representation is determined using a spline interpolation.

11. The camera of claim 5, wherein said subsample representation is determined using bi-cubic interpolation.

12. The camera of claim 5, wherein said changing the degree of said subsampling is determined based on data obtained from the camera relating to the settings of the camera at the time of image acquisition.

13. The camera of claim 12, wherein the data obtained from the camera includes an aperture setting or focus of the camera, or both.

14. The camera of claim 12, wherein the data obtained from the camera includes the distance of the subject from the camera.

15. The camera of claim 5, wherein said changing the degree of said subsampling is determined based on data obtained from the camera relating to image processing analysis of said precapture images.

16. The camera of claim 15, wherein said image processing analysis is based on histogram data obtained from said pre-capture image.

17. The camera of claim 15, wherein said image processing analysis is based on color correlogram data obtained from said pre-capture image.

18. The camera of claim 15, wherein said image processing analysis is based on global luminance or white balance image data, or both, obtained from said pre-capture image.

19. The camera of claim 15, wherein said image processing analysis is based on face detection analysis of said pre-capture image.

20. The camera of claim 15, wherein said image processing analysis is based on determining pixel regions with a color characteristic indicative of redeye.

21. The camera of claim 15, wherein said image processing analysis is performed in hardware.

22. The camera of claim 5, wherein said changing the degree of said subsampling is determined based on image metadata information.

23. The camera of claim 2, wherein said modifying the area is performed including the full resolution of said image.

24. The camera of claim 2, wherein said red-eye filter comprises a plurality of sub filters.

25. The camera of claim 1, further comprising:
   (d) a pixel locator for locating pixels having a color indicative of the red-eye phenomenon;
   (e) a shape analyzer for determining if a grouping of at least a portion of the pixels located by the pixel locator comprise a shape indicative of the red-eye phenomenon; and
   (f) a pixel modifier for modifying the color of the pixels within the grouping.

26. The camera of claim 25, further comprising a falsing analyzer for further processing the image in a vicinity of the grouping for details indicative of an eye, and for enabling the pixel modifier in response thereto.

27. The camera of claim 25, further comprising an exposure analyzer for determining if the image was acquired in a condition indicative of the red-eye phenomenon.

* * * * *